United States Patent [19]

Matsuura et al.

[11] Patent Number: 4,927,694

[45] Date of Patent: May 22, 1990

[54] METHOD OF PRODUCING SKIN-COVERED PAD FOR SEAT

[75] Inventors: Ichiro Matsuura; Toyoharu Chiyoshi, both of Ayase, Japan

[73] Assignee: Ikeda Bussan Co., Ltd., Ayase, Japan

[21] Appl. No.: 200,633

[22] Filed: May 26, 1988

[51] Int. Cl.⁵ .......................... B32B 1/04; B32B 3/02; B32B 3/26

[52] U.S. Cl. ..................................... 428/159; 428/71; 428/76; 428/160; 428/309.9; 428/314.4; 428/316.6

[58] Field of Search .................... 428/71, 76, 159, 160, 428/309.9, 314.4, 316.6, 318.6

[56] References Cited

U.S. PATENT DOCUMENTS

| | | | |
|---|---|---|---|
| 4,405,681 | 9/1983 | McEvoy | 428/309.9 |
| 4,409,163 | 10/1983 | Van Manen | 264/45.5 |
| 4,755,411 | 7/1988 | Wing et al. | 428/309.9 |
| 4,762,654 | 8/1988 | Fuchigami et al. | 428/316.6 |
| 4,808,450 | 2/1989 | Guy | 428/318.6 |

FOREIGN PATENT DOCUMENTS

| | | |
|---|---|---|
| 152130 | 8/1985 | European Pat. Off. . |
| 2746686 | 4/1979 | Fed. Rep. of Germany . |
| 2470566 | 6/1981 | France . |
| 60-160990 | 8/1985 | Japan . |
| 2002675 | 2/1979 | United Kingdom ............. 428/316.6 |

*Primary Examiner*—William J. Van Balen
*Attorney, Agent, or Firm*—Foley & Lardner, Schwartz, Jeffery, Schwaab, Mack, Blumenthal & Evans

[57] ABSTRACT

A method of producing a skin-covered pad for a seat is disclosed, which comprises (a) preparing a lower mold which has a cavity formed therein; (b) putting a bag-shaped outer skin member into the cavity, the outer skin member including an innermost foamed layer which consists of first and second parts which are exposed to the interior of the bag-shaped outer skin member, the first and second parts being wettable and non-wettable with respect to a given liquid material for foamed plastic; (c) pouring the liquid material into the bag-shaped outer skin member held in the lower mold, so that the innermost layer of the outer skin member is in contact with the liquid material for foamed plastic; and (d) putting an upper mold on the lower mold to close the cavity.

5 Claims, 2 Drawing Sheets

METHOD OF PRODUCING SKIN-COVERED PAD FOR SEAT

BACKGROUND OF THE INVENTION

1. Field of the Invention

The present invention relates in general to a method of producing a skin-covered pad of a seat, and more particularly to a method of producing a skin-covered pad which has decorative ridges or projections formed on a front face thereof.

2. Description of the Prior Art

Hitherto, in the field of seat manufacturing, a so-called "skin-covered pad" has been widely used as a cushion member of a seat cushion and/or a seatback. The skin-covered pad is arranged on the seat structure with its front face exposed to the outside. Usually, the skin-covered pad is produced by pouring a liquid material for foamed polyurethane or the like into a bag-shaped outer skin member held in a mold, and thereafter, curing the same in a suitable condition.

In order to improve the sitting comfort and the external appearance, some of the skin-covered pads are provided at their front faces with a plurality of decorative ridges or projections.

One of the methods for producing such ridges is taught by Japanese Patent First Provisional Publication No. 60-160990. In this method, the decorative ridges are previously provided to the bag-shaped outer skin member before the skin member is subjected to the molding of the polyurethane foam. That is, the bag-shaped outer skin member with the ridges is put into a mold, and thereafter, a liquid material for foamed polyurethane is poured into the bag-shaped skin member held in the mold and cured in a known manner. In order to properly hold the skin member therein, the mold has at its cavity bottom a corresponding number of grooves or recesses for engagement with the ridges of the skin member.

However, providing the ridges to the skin member prior to the urethane molding increases the number of production steps of the skin-covered pad. Furthermore, proper positioning of the skin member to the mold is difficult or at least troublesome because of need of the proper engagement between the ridges of the skin member and the grooves of the mold. In fact, if the urethane molding is carried out with the ridges of the skin member mismatched with the corresponding grooves of the mold, an inferior product is inevitably produced.

Furthermore, in the above-mentioned method, a new mold becomes necessary each time design changing of the skin-covered pad is required. This causes increase in cost of products.

SUMMARY OF THE INVENTION

It is therefore an object of the present invention to provide a method of providing a skin-covered pad having decorative ridges or projections formed thereon, which method is free of the above mentioned drawbacks.

According to the present invention, there is provided an improved method of producing a skin-covered pad for a seat. The method comprises (a) preparing a lower mold which has a cavity formed therein; (b) putting a bag-shaped outer skin member into the cavity, the outer skin member including an innermost foamed layer which consists of first and second parts which are exposed to the interior of the bag-shaped outer skin member, the first and second parts being wettable and non-wettable with respect to a given liquid material for foamed plastic; (c) pouring the liquid material into the bag-shaped outer skin member held in the lower mold, so that the innermost layer of the outer skin member is in contact with the liquid material for foamed plastic; and (d) putting an upper mold on the lower mold to close the cavity.

According to the present invention, there is further provided a skin-covered pad for a seat. The skin-covered pad comprises a base structure of foamed plastic; and an outer skin member which covers the base structure, the outer skin member including an innermost foamed layer which consists of first and second parts which are exposed to the base structure, the first and second parts being wettable and non-wettable with respect to a liquid material of the base structure.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, a method according to the present invention will be described in detail with reference to the accompanying drawings.

Figure 1:
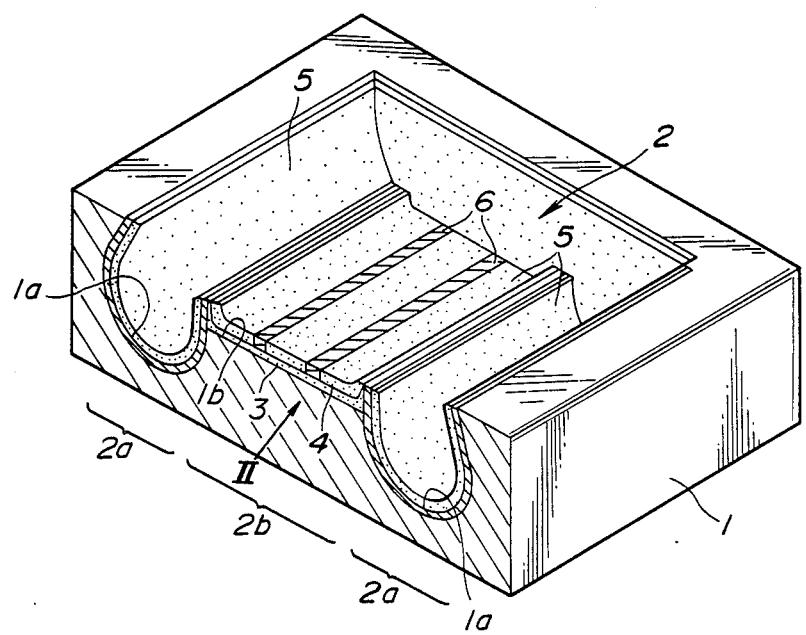
FIG. 1 is a partically cut perspective view of a lower mold used in a method according to the present invention, with a bag-shaped outer skin member properly set in the mold.

FIG. 1 shows a lower mold 1 which is used in the method according to the invention.

The lower mold 1 has a cavity formed therein which comprises laterally spaced two deeper rounded portions 1a and a shallower flat portion 1b which is arranged between the deeper portions 1a, as shown. That is, the cavity of the lower mold is shaped to match with the contour of a backet-type seat cushion.

Figure 2A:
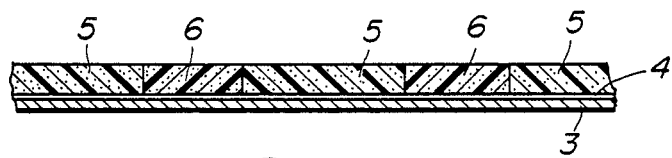
FIGS. 2a, 2b and 2c are views of the part indicated by an arrow II in FIG. 1, showing various conditions of the part during molding of urethane foam.
Figure 2B:
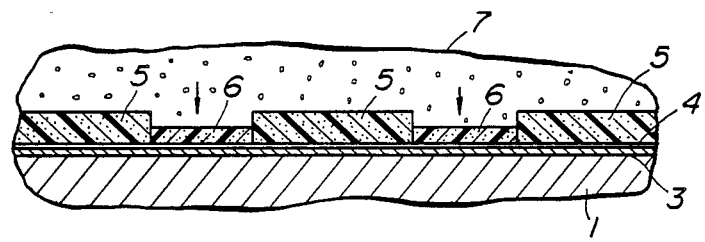
Figure 2C:
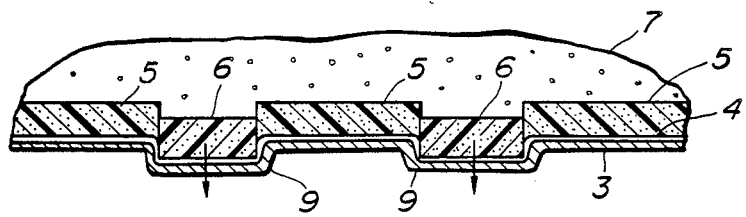
Figure 3:
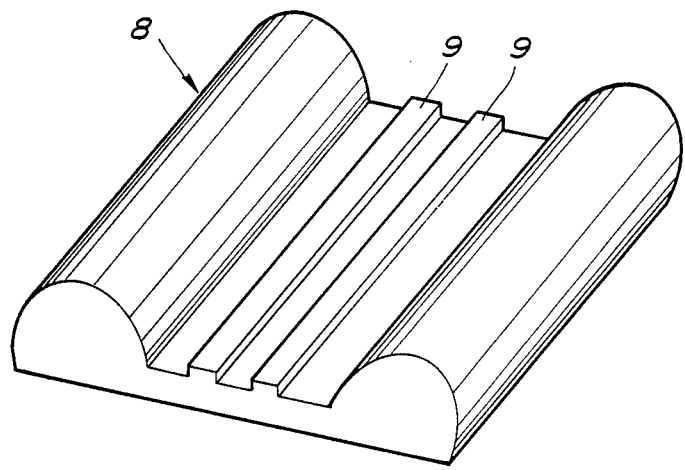
FIG. 3 is a perspective view of a skin-covered pad produced by the method of the present invention.

In the following, the steps for producing the skin-covered pad 10 (see FIG. 2) will be described.

First, a bag-shaped outer skin member 2 is prepared. The skin member 2 is shaped to match with the shape of the cavity of the lower mold 1 and thus comprises generally three parts 2a, 2b and 2a, which are stitched to one another to constitute a bag-shaped structure. Each part is of a layered structure which comprises an outer skin 3 of knitted cloth, a non-wettable backing sheet 4 lined on the outer skin 3 and a wettable wadding 5 lined on the backing sheet 4. The wettable wadding 5 is constructed of an open-cell polyurethane foam which is wettable to or intimate with a liquid material of polyurethane foam. (The "wettable wadding" is thus to be understood as a wadding which can be permeated with the liquid material.) As is shown in the drawings, two parallel strap members 6 are arranged in the wettable wadding 5 of the middle part 2b of the bag-shaped skin member 2. The strap members 6 are constructed of a non-wettable material, such as a closed-cell polyurethane, a polyurethane foam with baked outer surface or the like. Each strap member 6 is put in an elongate cut formed in the wettable wadding 5 and bonded to the wadding 5 through a suitable adhesive, as is seen from FIG. 2a. If desired, the bonding may be made through a high frequency welding technique.

The bag-shaped outer skin member 2 having the above-mentioned construction is properly set in the lower mold 1. Then, a liquid material for polyurethane foam is poured into the skin member 2 held in the lower mold 1 and thereafter, an upper mold (not shown) is put on the lower mold 1 to close the cavity. Thus, thereafter, the urethane material is cured within the enclosed cavity. During this curing, as is seen from FIG. 2b, the non-wettable strap members 6 are compressed considerably by foaming pressure generated during the curing thereby reducing its thickness. While, the wettable wadding 5 does not show a notable reduction in thickness because it can impregnate the urethane material.

After the urethane material is hardened to a sufficient level, the upper mold is dismantled from the lower mold 1 and then a poduct, viz., the skin-covered pad 8, is removed from the lower mold 1. Upon this, due to removal of the lower mold 1 against which the compressed non-wettable strap members 6 have been pressed, the members 6 are expanded outwardly as is seen from FIG. 2c thereby forming two parallel ridge portions 9 on the front surface of the skin-covered pad 8.

Since the decorative ridge portions 9 of the skin-covered pad 8 are produced automatically at the time when the urethane molding is completed, the production effeciency of the pad 8 is considerably increased. Furthermore, since the number and the shape of the ridge portions 9 on the product 8 can be easily changed by modifying the structure of the middle part 2b of the bag-shaped outer skin member 2, there is no need of preparing respective molds for the products having different ridge portions.

What is claimed is:

1. A skin-covered pad for a seat, comprising:
    a base structure of foamed plastic; and
    an outer skin member which covers said base structure, wherein said outer skin member includes:
    an innermost foamed layer having an inner surface intimately contacting said base structure, and having first wettable and second nonwettable parts, said first and second parts being wettable and nonwettable with respect to a liquid material used to produce said base structure;
    an outermost layer covering said innermost foamed layer, and
    a non-wettable backing sheet interposed between said outermost and innermost layers,
    wherein said second part of said innermost foamed layer is expanded outward thereby to provide the outer surface of said outer skin member with a raised portion.

2. A skin-covered pad as claimed in claim 1, in which said outer skin member has an outward projection at the position where said second part is located.

3. A skin-covered pad as claimed in claim 2, in which said foamed plastic is a polyurethane foam.

4. A skin-covered pad as claimed in claim 3, in which said first part of said outer skin member is an open-cell polyurethane foam, and said second part of said outer skin member is a closed-cell polyurethane foam.

5. A skin-covered pad as claimed in claim 3, in which said first part of said outer skin member is an open-cell polyurethane foam and said second part of said outer skin member is an open-cell polyurethane foam which has a baked outer surface.

* * * * *